(12) United States Patent
Littau

(10) Patent No.: US 6,581,864 B1
(45) Date of Patent: Jun. 24, 2003

(54) CERAMIC CLUTCH ASSEMBLY FOR BAITCAST FISHING REEL

(75) Inventor: Christopher S. Littau, Bartlesville, OK (US)

(73) Assignee: W. C. Bradley/Zebco Holdings, Inc., Tulsa, OK (US)

(*) Notice: Subject to any disclaimer, the term of this patent is extended or adjusted under 35 U.S.C. 154(b) by 0 days.

(21) Appl. No.: 09/900,537

(22) Filed: Jul. 7, 2001

(65) Prior Publication Data

(51) Int. Cl.$^7$ ............................................... A01K 89/02
(52) U.S. Cl. ........................................ 242/268; 242/298
(58) Field of Search ............................... 242/257, 259, 242/262, 247, 285, 298, 396.2; 384/907.1, 297

(56) References Cited

U.S. PATENT DOCUMENTS

| | | | |
|---|---|---|---|
| 3,972,233 A | * | 8/1976 | Pelt et al. .................... 384/297 |
| 4,196,868 A | | 4/1980 | Puryear et al. |
| 4,371,124 A | | 2/1983 | Giffford et al. |
| 4,426,045 A | | 1/1984 | Gifford |
| 4,545,545 A | | 10/1985 | Councilman |
| 4,549,702 A | | 10/1985 | Councilman |
| 4,676,450 A | | 6/1987 | Carpenter et al. |
| 5,207,396 A | | 5/1993 | Furomoto |
| 5,224,782 A | * | 7/1993 | Miwa et al. ................. 384/100 |
| 5,503,343 A | * | 4/1996 | Hirano et al. ................ 242/247 |
| 5,713,529 A | | 2/1998 | Atherton et al. |
| 5,921,491 A | | 7/1999 | Kim |
| 6,045,075 A | | 4/2000 | Iwabuchi et al. |
| 6,152,389 A | | 11/2000 | Kim |
| 6,206,311 B1 | | 3/2001 | Kim et al. |
| 6,209,816 B1 | * | 4/2001 | Hitomi et al. ............... 242/310 |
| 2001/0020661 A1 | * | 9/2001 | Ohara ......................... 242/264 |

* cited by examiner

Primary Examiner—Michael R. Mansen
(74) Attorney, Agent, or Firm—Fellers, Snider, Blankenship, Bailey & Tippens, P.C.

(57) ABSTRACT

In a baitcast type fishing reel, there is provided a unitary cylindrical ceramic member secured about the crankshaft of the reel, the ceramic member having a sleeve portion extending through a one-way clutch. The ceramic member may include one or more substantially planar surfaces extending perpendicular to the longitudinal axis of the sleeve portion to affect operation of a drag mechanism.

4 Claims, 5 Drawing Sheets

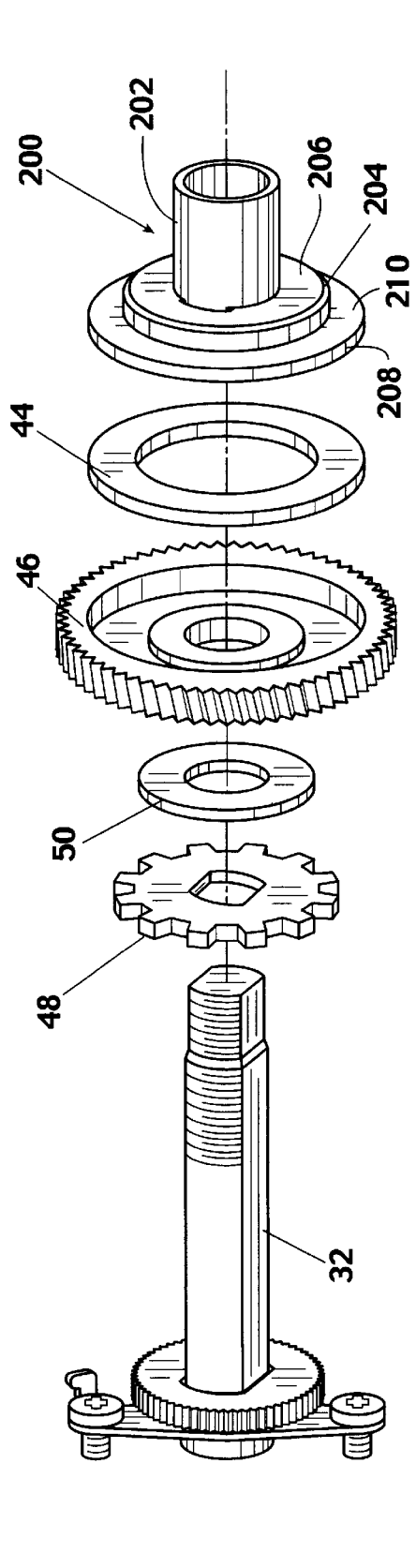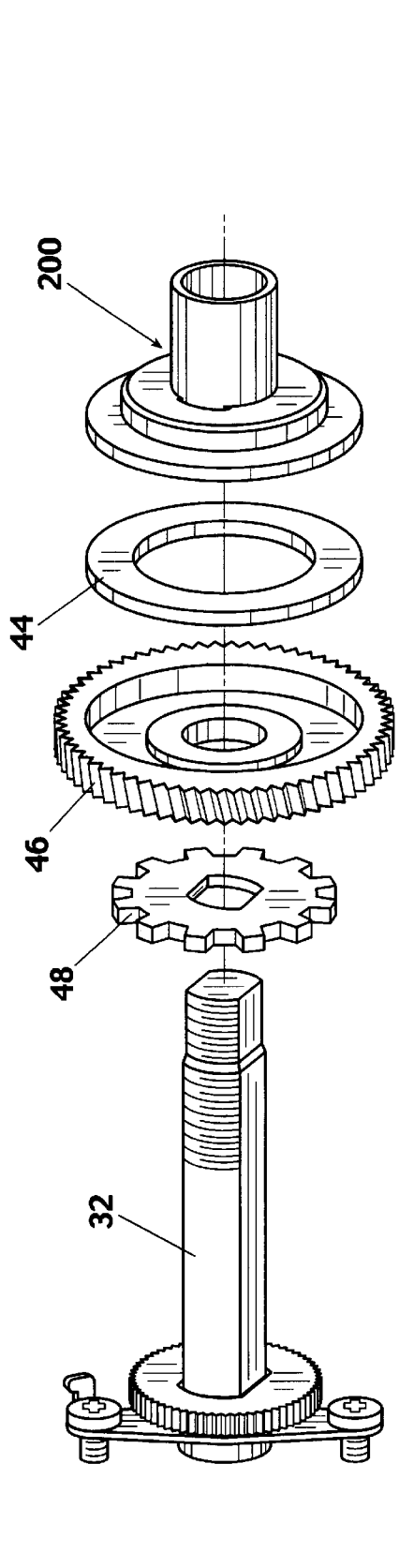

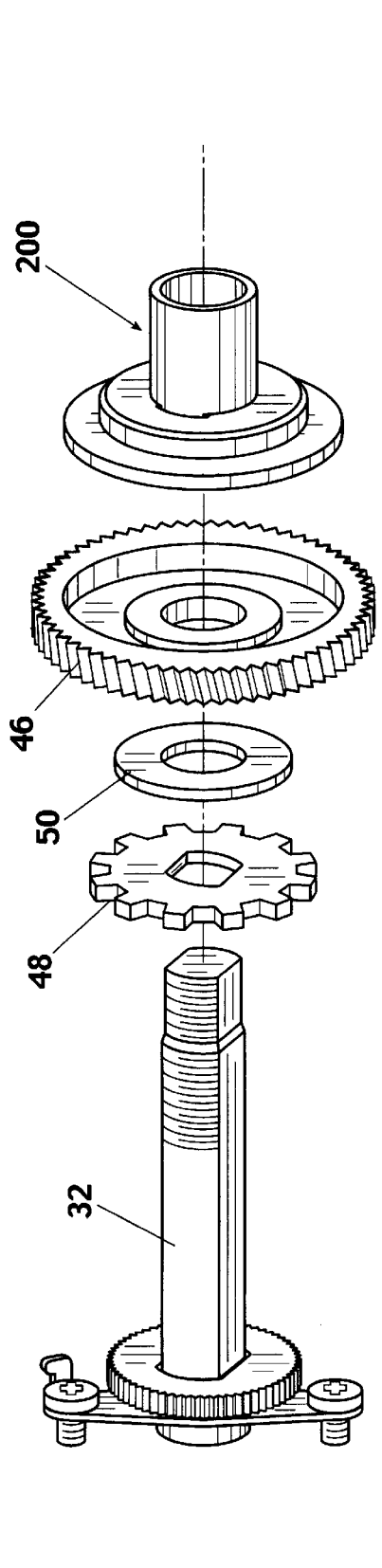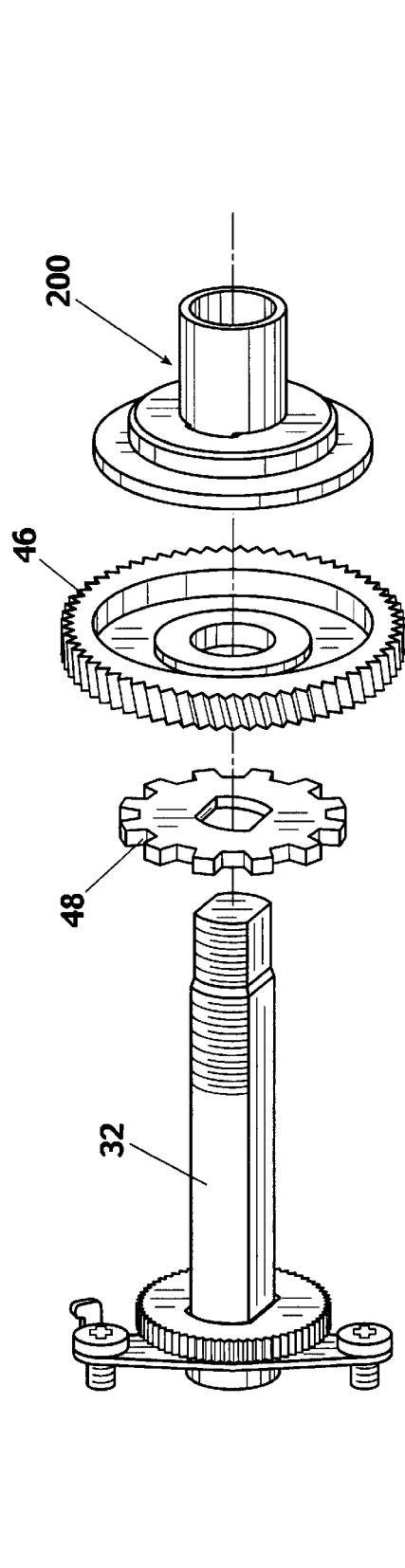

CERAMIC CLUTCH ASSEMBLY FOR BAITCAST FISHING REEL

BACKGROUND OF THE INVENTION

1. Field of the Invention

This invention relates generally to clutch mechanisms for fishing reels. More particularly, but not by way of limitation, the present invention relates to a ceramic clutch sleeve and/or clutch sleeve assembly for a baitcast fishing reel.

2. Background

Baitcast fishing reels are well known in the art. A baitcast reel will typically comprise a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; and an exterior actuator (typically a thumb lever) for disengaging the pinion gear from the spool shaft to allow the spool to rotate freely during casting. Such reels typically further include a clutch mechanism for preventing reverse rotation of the crank handle and drag structure for applying a variable drag force to the line-carrying spool so that any pull on the line in the direction of line pay-out, such as normally occurs when a fish bites, in excess of that to which the drag is set, will cause the spool to turn.

One-way clutches are well known in the art under a variety of common names such as roller clutches, overrun clutches, and sprag clutches. For casting, a thumb-operated mechanism or other means is typically provided for releasing the clutch to allow free rotation of the spool in the unwinding direction. In the conventional baitcast reel, the crankshaft of the reel will extend through the one-way clutch such that, when the crank handle is turned in the forward direction, the clutch overruns, thereby allowing free rotation of the crank handle. However, when the crank handle is turned in the opposite direction, the clutch will engage and grip the crankshaft, thus preventing rotation in the reverse direction.

Conventional drag apparatus, such as found in baitcast reels, includes a drag washer normally keyed on an end portion of the crankshaft such that the drag washer rotates with the crankshaft. The drag washer will generally have a friction pad or disk facing axially and in friction-engaging contact with one face of a driving gear. The driving gear is freely rotatably and axially movable on the crankshaft, and meshes with the input pinion gear on the spool shaft. A ratchet wheel is normally secured to the crankshaft so as to rotate with, but is prohibited from axial movement on, the crankshaft. Generally, a second friction pad or disk is mounted on an axial face of the ratchet wheel for friction-engaging contact with the other face of the driving gear.

In baitcast reels having a one-way clutch, the drag washer is generally forced against the driving gear by the clutch sleeve. Using a drag adjustment knob on the crankshaft, the clutch sleeve is normally forced against the drag washer, via a drag link, so as to create a sufficient frictional force on either side of the driving gear to rotate the driving gear to retrieve line onto the spool, and also to set the drag to an appropriate setting.

As can thus be appreciated, conventional clutch and drag assemblies unfortunately possess a number of parts, generally metallic, which are prone to corrode and wear. Because the reels are utilized in wet environments, the reel parts, including the clutch and drag assemblies, often exhibit rusting in freshwater and more advanced corrosion in saltwater. The metallic parts are also prone to indent and damage, which causes noise, tight spots and roughness in reel operation.

Thus it is an object of the present invention to provide an improved crankshaft assembly for a baitcast fishing reel which overcomes the aforementioned deficiencies.

SUMMARY OF THE INVENTION

In one aspect, the present invention provides a unitary ceramic member secured about the crankshaft of the reel, the ceramic member comprising a cylindrical clutch sleeve which extends through a one-way clutch. There is thus obtained a rust and corrosion resistant, quiet and durable clutch sleeve for a fishing reel.

Although beneficial results may be obtained through the use of the inventive clutch sleeve, even more advantages may be obtained by providing the unitary ceramic member with a first cylindrical sleeve portion for extending through a one-way clutch and one or more larger diameter portions having substantially planar surfaces extending perpendicular to the longitudinal axis of the first cylindrical sleeve portion. In one aspect, the unitary ceramic member is provided with a single larger diameter second portion to obviate the need for a metallic drag link, whereas in another aspect both the drag link and metallic drag washer are eliminated in favor of a ceramic member having a sleeve portion and first and second larger diameter portions.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 7 is an exploded view of the crankshaft assembly showing another example of a part consolidation using the teachings of the present invention.

FIG. 8 is an exploded view of the crankshaft assembly showing still another example of a part consolidation using the teachings of the present invention.

FIG. 9 is an exploded view of the crankshaft assembly showing still another example of a part consolidation using the teachings of the present invention.

FIG. 10 is an exploded view of the crankshaft assembly showing still another example of a part consolidation using the teachings of the present invention.

DETAILED DESCRIPTION OF THE PREFERRED EMBODIMENTS

Before explaining the present invention in detail, it is important to understand that the invention is not limited in its application to the details of the construction and the steps described herein. The invention is capable of other embodiments and of being practiced or carried out in a variety of ways. It is to be understood that the phraseology and terminology employed herein is for purpose of description and not of limitation.

Figure 1:
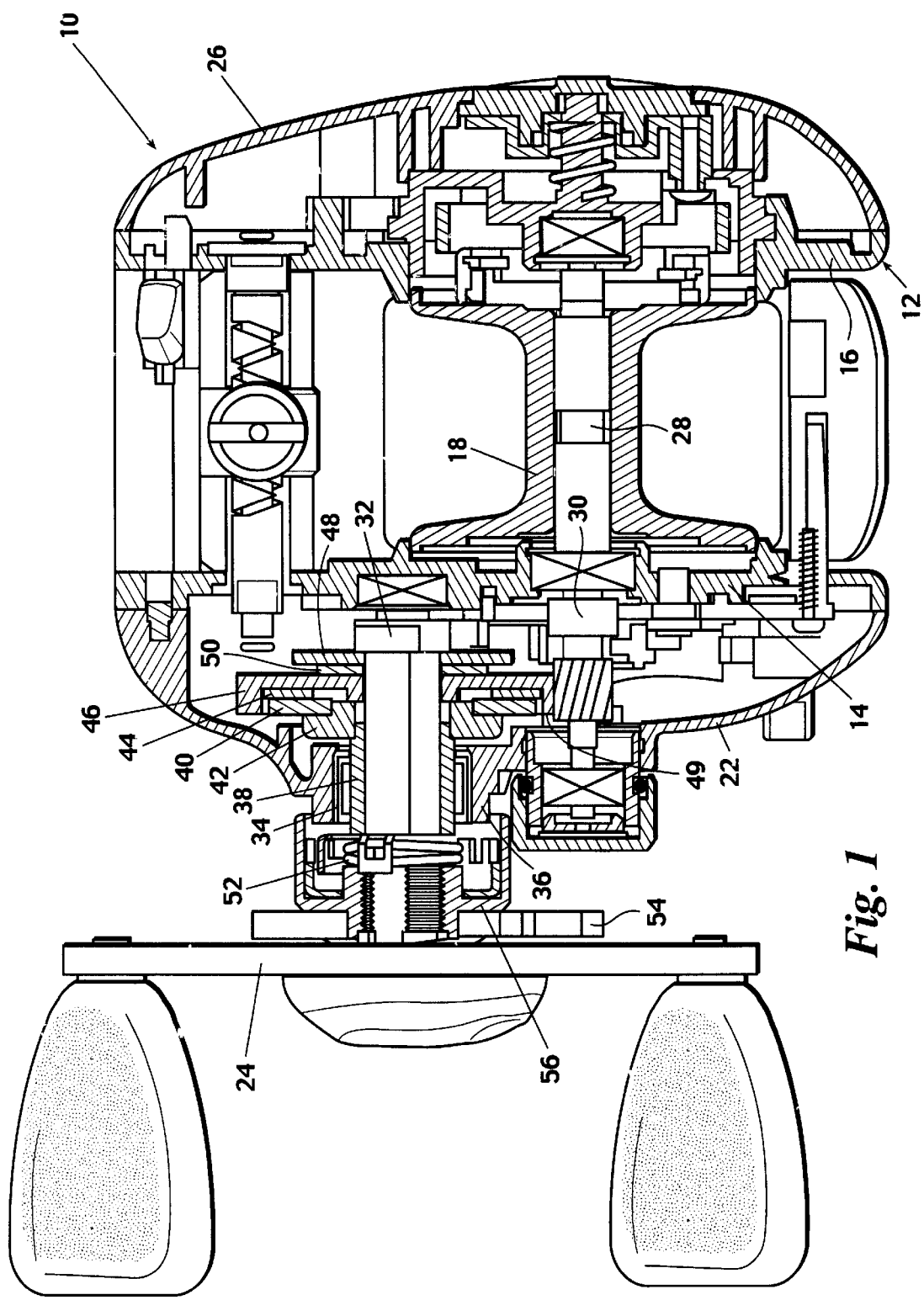
FIG. 1 is a sectional bottom view of a typical baitcast fishing reel which houses a crankshaft assembly which includes, inter alia, a clutch assembly.
Figure 2:
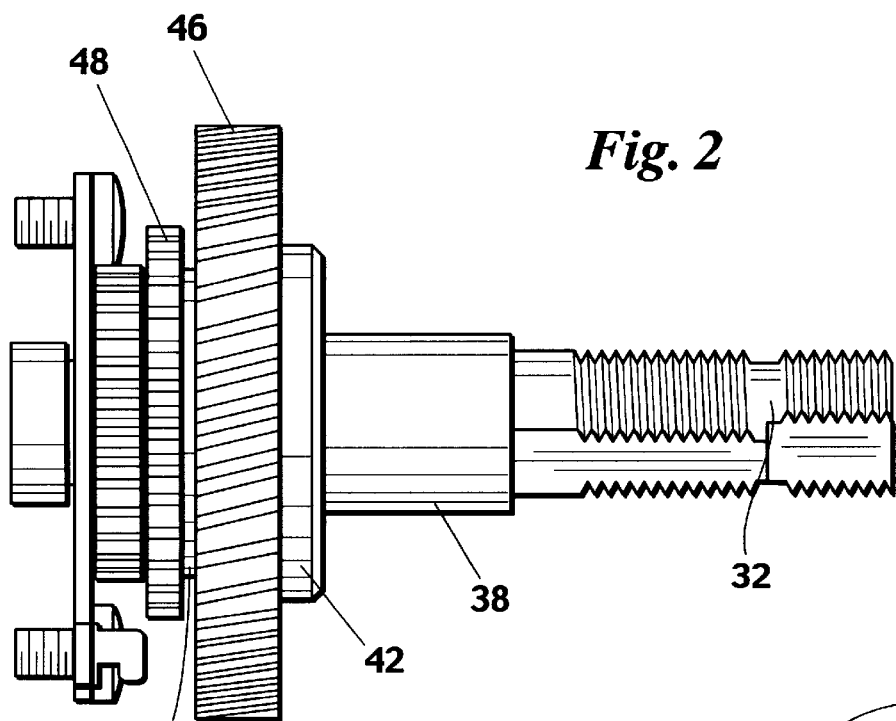
FIG. 2 is a side view of the crankshaft assembly in an assembled state.
Figure 3:
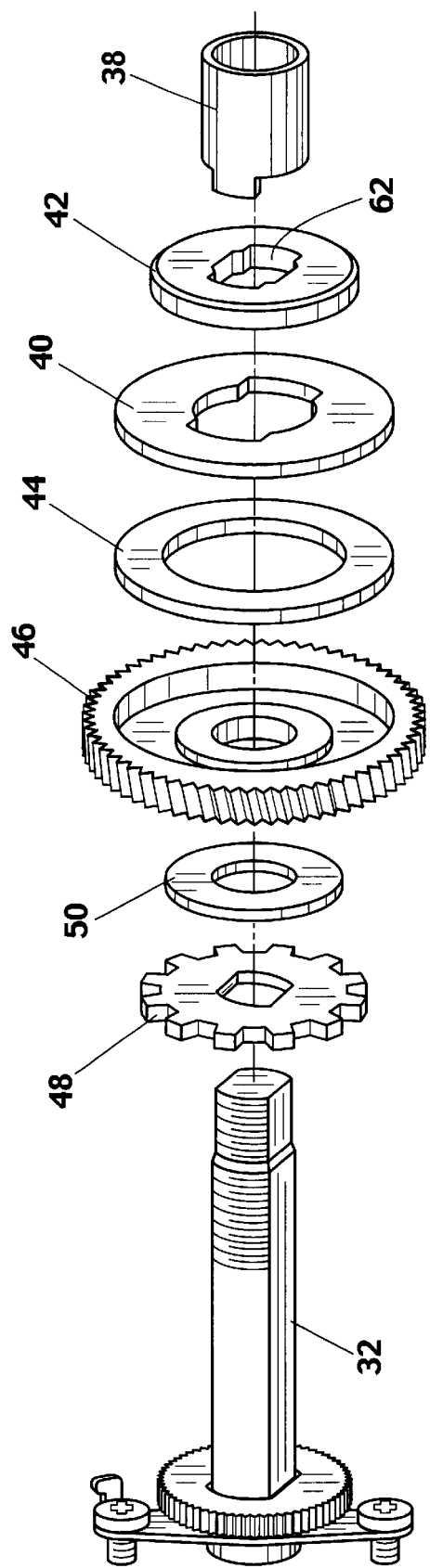
FIG. 3 is an exploded view of the crankshaft assembly shown in FIG. 2.

Referring now to FIGS. 1–3, wherein like reference numerals designate identical or corresponding parts throughout the several views, there is shown a baitcast reel 10 including a frame 12 having a right side plate 14 and a left side plate 16; a line spool 18 rotatably mounted in frame 12 between side plates 14 and 16; a right side cover 22 secured over right side plate 14; a crank handle 24, operably extending from right side cover 22, for rotating spool 18; and a left side cover 26 secured over left side plate 16. A reel foot (not shown) is provided on the bottom of frame 12 for attaching reel 10 to a fishing rod. A spool shaft 28 is mounted between the laterally spaced side plates 14 and 16. A driven pinion gear 30 is keyed to rotate with the spool shaft 28 and is axially slidable on the spool shaft 28. The pinion gear 30 is operatively manipulated by a clutch system (not shown) that is well-known in the art.

As will be readily understood by those skilled in the art, baitcast reel 10 includes numerous other components and features which are commonly employed in reels of this type but are not relevant to the present invention. Those mechanisms requiring description so that the present invention may be fully appreciated are explained in detail below. Further reference may be had to issued United States patents in the name of Brunswick Corporation, for example, to U.S. Pat. Nos. 6,206,311 or 6,152,389 or 5,921,491, such patents being incorporated herein by reference, for additional description of other conventional elements of a baitcast fishing reel. Moreover, although the inventive apparatus is herein described as incorporated in a right-handed baitcasting reel, the inventive apparatus is equally adaptable for use in left-handed baitcasting reels, as well as other types of fishing reels.

Included in the right side of reel 10 is a crankshaft assembly comprising a crankshaft 32; a one-way clutch 34 retained in an open boss 36 projecting from right side cover 22; and a clutch sleeve 38 received in clutch 34. Crank handle 24 is secured on the exterior end of crankshaft 32. Clutch sleeve 38 is keyed or otherwise secured on crankshaft 32 such that sleeve 38 and crankshaft 32 are prevented from rotating independently of each other.

A drag mechanism is likewise mounted on the crankshaft 32, and in the embodiment shown in FIGS. 1–3 includes a drag washer 40, a link 42 and the clutch sleeve 38. The link 42 is keyed on the crankshaft 32 and is only axially movable thereon. The drag washer 40 and the clutch sleeve 38 are axially movable on the crankshaft, the clutch sleeve 38 being keyed to the link 42. The drag washer 40 may include a friction pad 44 facing axially and in friction-engaging contact with one face of a driving gear 46. The driving gear 46 includes an annular shoulder 49 defining an inner diameter. The friction pad 44 is mounted at or near the outer perimeter of the drag washer 40, with the diameter of the drag washer 40 substantially equal to the inner diameter of the driving gear 46. Accordingly, applying the lateral force to the driving gear 46 over substantially the outermost diameter of the drag washer 40, permits the application of a relatively large force to the driving gear 46 with a relatively minimal tightening torque.

The driving gear 46 is freely rotatably and axially movable on the crankshaft 32. The driving gear 46 meshes with the pinion gear 30 on the spool shaft 28. A ratchet wheel 48 is secured to the crankshaft 32 so as to rotate with the crankshaft, but is prohibited from axial movement relative to the crankshaft 32. A second friction pad 50 is mounted on an axial face of the ratchet wheel 48 for friction-engaging contact with the other face of the driving gear 46.

Belleville springs 52 encircle the crankshaft 32 at the outer end thereof with a drag-actuating knob, or star drag 54, threaded on the crankshaft 32. The drag-actuating knob 54 has a sleeve portion 56 bearing against one side of the belleville springs 52. The other side of the belleville springs 52 bears against the clutch sleeve 38.

Turning the drag-actuating knob 54 in one direction relative to the crankshaft 32 urges the belleville springs 52, clutch sleeve 38, link 42 and drag washer 40 against the driving gear 46 and ratchet wheel 48 to increase the captive force on the driving gear 46 between the link 42 and ratchet wheel 48, which are keyed to rotate with the crankshaft 32, to thereby cause the driving gear 46 to be slippingly held to the crankshaft 32 for rotation with the crankshaft 32. Turning the drag-actuating knob 54 in the opposite direction reduces the captive force on the driving gear 46.

Figure 4:
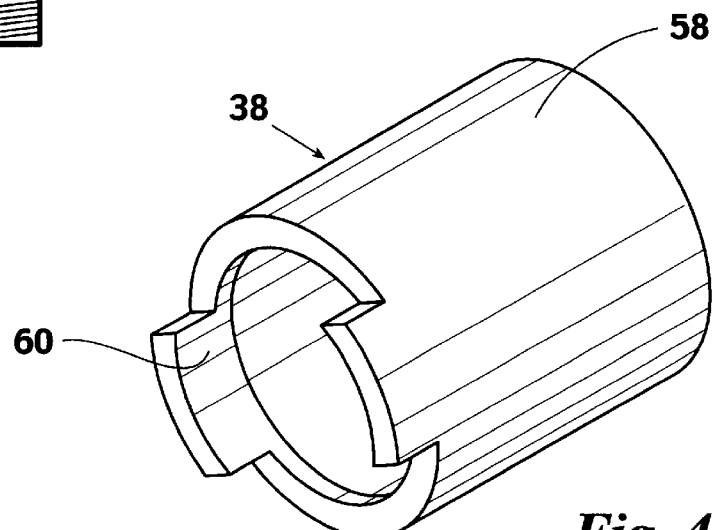
FIG. 4 is a perspective view a one form of clutch sleeve.
Figure 5:
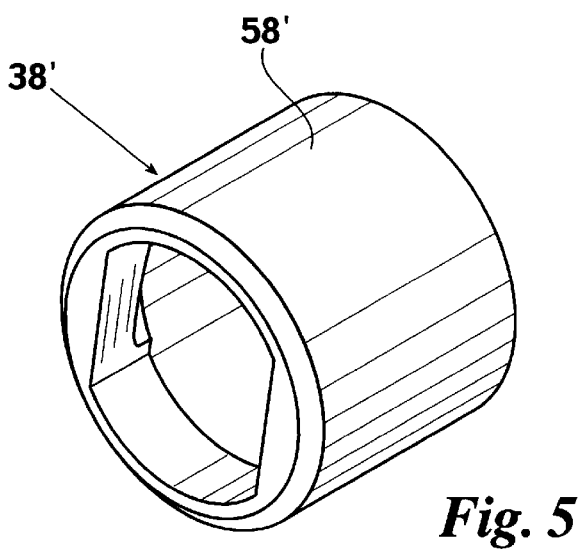
FIG. 5 is a perspective view of another form of clutch sleeve.

A perspective view of the clutch sleeve 38 is shown in FIG. 4. The clutch sleeve 38 consists of a cylindrical shell 58 having a pair of legs 60 extending axially from an end thereof. In a preferred form, the legs 60 are diametrically opposed. The legs 60 of the clutch sleeve 38 are keyed in complementary recesses 62 formed in the link 42 (FIG. 3). It should be understood, however, that an alternate form of clutch sleeve, such as clutch sleeve 38' shown in FIG. 5, comprising a cylindrical shell 58' without legs, may be substituted for clutch sleeve 38 by keying the clutch sleeve 38' directly to the crankshaft 32. When clutch sleeve 38' is substituted, there is no need for drag link 42, which may be eliminated.

It should also be recognized that clutch sleeve 38' also would find utility in the clutch mechanism of a spinning type fishing reel. Spinning reels are well known in the art, typically comprising a housing with an oscillating spool at its forward end, a rotor rotating about the spool axis by cooperative movement of a crank handle, and an associated bail assembly that wraps line onto the oscillating spool. A typical spinning style reel is shown and described in U.S. Pat. No. 4,371,124 to Gifford et al., and later in U.S. Pat. Nos. 4,545,545 and 4,549,702. Further reference is made to U.S. Pat. Nos. 5,713,529, 4,676,450 and 4,426,045 for a detailed explanation of typical spinning reel operating mechanisms. All of the above-identified patents are incorporated herein by reference.

In connection with a first aspect of the present invention, the clutch sleeve 38 or 38' (hereinafter collectively referred to by the reference numeral 38) is made of a ceramic material, examples of which include silicon nitride, zirconia or aluminum oxide. Providing a ceramic clutch sleeve 38 eliminates the problem of rusting and corrosion and provides the further benefit of a harder surface to prevent indentation from the needle rollers of the clutch 34. This serves to reduce noise and tight spots and also provides a smoother surface and lower coefficient of friction, which further reduces noise and improves reel "feel". Do to the extreme hardness of ceramics, the inventive clutch sleeve 38 exhibits almost no wear, which makes it extremely durable.

In connection with another aspect of the invention, additional advantages are obtained by providing a unitary crankshaft ceramic member keyed or otherwise secured on crankshaft 32 such that the ceramic member and crankshaft 32 are prevented from rotating independently of each other. The ceramic member has a first cylindrical sleeve portion and at least one larger diameter, preferably cylindrical, second portion, the second portion possessing a substantially planar surface extending perpendicular to the longitudinal axis of the cylindrical sleeve portion.

Figure 6:
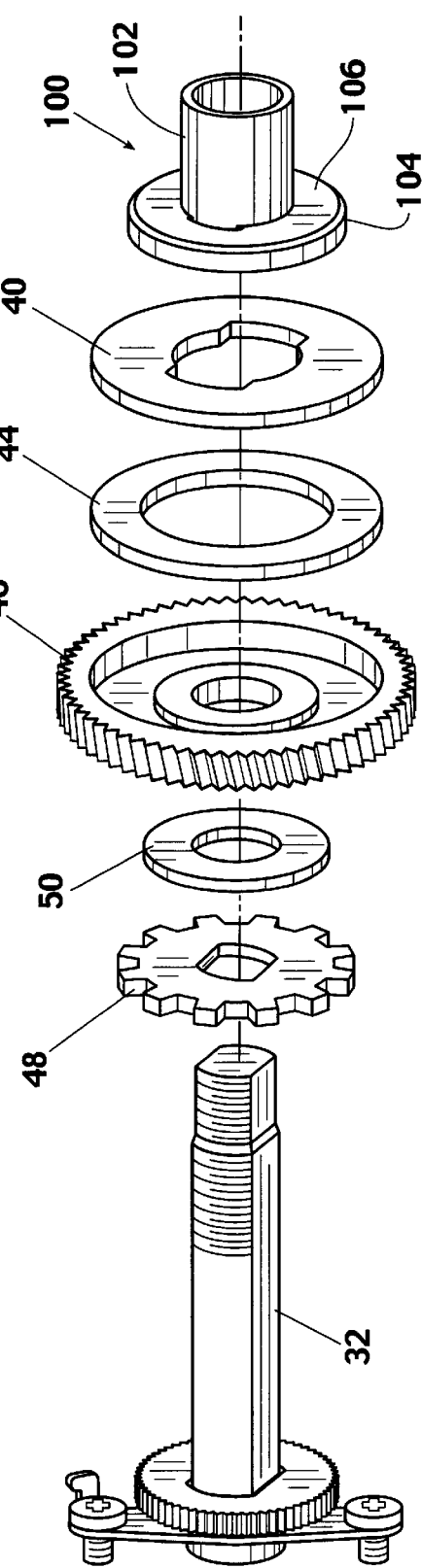
FIG. 6 is an exploded view of the crankshaft assembly showing one example of a part consolidation using the teachings of the present invention.

Now referring to FIG. 6, there is provided in one embodiment a unitary crankshaft ceramic member 100 having a first cylindrical sleeve portion 102 and a single larger diameter second cylindrical portion 104. The second cylindrical portion 104 includes a substantially planar surface 106 extending perpendicular to the longitudinal axis of the first cylindrical sleeve portion 102 such that it lies in abutting relationship to the drag washer 40. In this manner the aforedescribed drag link 42 is eliminated to avoid problems associated with wear on the drag link caused by a harder ceramic clutch sleeve. Further benefits are obtained though the elimination of tolerances between the conventional clutch sleeve 38 and drag link 42 and the reduction of weight achieved by substituting ceramic member 100 for a conventional metallic clutch sleeve 38 and drag link 42. As an alternative, the drag link 42 and drag washer 40 could be made as separate ceramic parts.

In the embodiment exemplified in FIG. 7, there is provided a unitary crankshaft ceramic member 200 having a first cylindrical sleeve portion 202, a larger diameter second cylindrical portion 204 having a substantially planar surface 206 extending perpendicular to the longitudinal axis of the first cylindrical sleeve portion 202, and a still larger third cylindrical portion 208 having a substantially planar surface 210 also extending perpendicular to the longitudinal axis of the first cylindrical sleeve portion 202. In this embodiment, the drag washer 40 as well as the drag link 42 of a conventional crankshaft assembly have been eliminated to achieve the aforedescribed advantages.

As an adjunct of utilizing a unitary crankshaft ceramic member, it has surprisingly been discovered that either or both the first and second friction pads or disks 44 and 50 may be eliminated from the crankshaft assembly, yet reel performance maintained at an acceptable level. Thus, there also is provided in accordance with the present invention fishing reels having the inventive unitary crankshaft ceramic member 100 or 200 wherein one or both friction pads or disks 44 and 50 are eliminated, such as exemplified in FIGS. 8–10, to which attention is now directed.

The crankshaft assembly illustrated in FIG. 8 includes the aforedescribed ceramic member 200 in combination with friction pad 44, driving gear 46 and ratchet wheel 48, friction pad 50 having been eliminated; while in FIG. 9 friction pad 44 is eliminated in favor of friction pad 50. In the crankshaft assembly shown in FIG. 10, both friction pads 44 and 50 have been eliminated from the assembly. If one or more of the friction pads 44 and 50 are eliminated, wear on the driving gear 46 (which is normally brass) caused by the harder ceramic components could be eliminated by making the driving gear 46 of a ceramic material or providing an additional part to separate the driving gear 46 from the ceramic components.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In a fishing reel having a frame, a line-carrying spool rotatably mounted relative to the frame, a crankshaft rotatably mounted relative to the frame, a driving gear rotatably mounted relative to the crankshaft and selectively responsive to rotation of the crankshaft to drive the spool, the crankshaft extending through a one-way clutch, and a drag mechanism for frictionally engaging the driving gear and causing the driving gear to slippingly follow rotation of the crankshaft, the improvement comprising:
   a unitary ceramic member secured about said crankshaft, said ceramic member further including:
      a first cylindrical sleeve portion extending through said one-way clutch; and
      a larger diameter second portion having a substantially planar surface extending perpendicular to the longitudinal axis of the first cylindrical sleeve portion;
   wherein said drag mechanism includes a drag washer and said planar surface of said ceramic member is in abutting relationship to said drag washer.

2. The fishing reel of claim 1 wherein said second portion is cylindrical.

3. In a fishing reel having a frame, a line-carrying spool rotatably mounted relative to the frame, a crankshaft rotatably mounted relative to the frame, a driving gear rotatably mounted relative to the crankshaft and selectively responsive to rotation of the crankshaft to drive the spool, the crankshaft extending through a one-way clutch, and a drag mechanism for frictionally engaging the driving gear and causing the driving gear to slippingly follow rotation of the crankshaft, the improvement comprising:
   a unitary ceramic member secured about said crankshaft, said ceramic member further including:
      a first cylindrical sleeve portion extending through said one-way clutch; and
      a larger diameter second portion having a substantially planar surface extending perpendicular to the longitudinal axis of the first cylindrical sleeve portion;
      a third portion of a larger diameter than said second portion, said third portion having a substantially planar surface extending perpendicular to the longitudinal axis of the first cylindrical sleeve portion;
   wherein said drag mechanism does not include a separable drag washer and wherein said planar surface of said third portion directly abuts said driving gear.

4. In a fishing reel having a frame, a line-carrying spool rotatably mounted relative to the frame, a crankshaft rotatably mounted relative to the frame, a driving gear rotatably mounted relative to the crankshaft and selectively responsive to rotation of the crankshaft to drive the spool, the crankshaft extending through a one-way clutch, and a drag mechanism for frictionally engaging the driving gear and causing the driving gear to slippingly follow rotation of the crankshaft, the improvement comprising:
   a unitary ceramic member secured about said crankshaft, said ceramic member further including:
      a first cylindrical sleeve portion extending through said one-way clutch; and
      a larger diameter second portion having a substantially planar surface extending perpendicular to the longitudinal axis of the first cylindrical sleeve portion;
      a third portion of a larger diameter than said second portion, said third portion having a substantially planar surface extending perpendicular to the longitudinal axis of the first cylindrical sleeve portion;
   wherein said drag mechanism does not include a separable drag washer and wherein said planar surface of said third portion directly abuts a friction pad adjacent said driving gear.

* * * * *